(12) United States Patent
Moyer et al.

(10) Patent No.: US 7,155,618 B2
(45) Date of Patent: Dec. 26, 2006

(54) LOW POWER SYSTEM AND METHOD FOR A DATA PROCESSING SYSTEM

(75) Inventors: William C. Moyer, Dripping Springs, TX (US); Brian M. Millar, Austin, TX (US); Michael D. Fitzsimmons, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 628 days.

(21) Appl. No.: 10/094,053

(22) Filed: Mar. 8, 2002

(65) Prior Publication Data

US 2003/0172310 A1   Sep. 11, 2003

(51) Int. Cl.
*G06F 1/32* (2006.01)
*G06F 1/26* (2006.01)

(52) U.S. Cl. ........................... 713/320; 713/322
(58) Field of Classification Search ................ 713/320, 713/322, 601
See application file for complete search history.

(56) References Cited

U.S. PATENT DOCUMENTS

| | | | | |
|---|---|---|---|---|
| 4,514,728 A | * | 4/1985 | Ahuja | ...................... 340/825.5 |
| 4,907,150 A | * | 3/1990 | Arroyo et al. | ............... 713/323 |
| 5,428,790 A | | 6/1995 | Harper et al. | |
| 5,471,625 A | * | 11/1995 | Mussemann et al. | ........ 713/322 |
| 5,625,807 A | * | 4/1997 | Lee et al. | .................... 713/601 |
| 5,790,609 A | * | 8/1998 | Swoboda | ..................... 375/357 |
| 5,898,879 A | * | 4/1999 | Kim | ............................. 713/322 |
| 6,070,215 A | | 5/2000 | Deschepper et al. | |
| 6,163,848 A | * | 12/2000 | Gephardt et al. | ........... 713/322 |
| 6,633,987 B1 | * | 10/2003 | Jain et al. | .................... 713/300 |
| 6,769,046 B1 | * | 7/2004 | Adams et al. | .............. 710/316 |
| 2001/0042147 A1 | | 11/2001 | Adams et al. | |

FOREIGN PATENT DOCUMENTS

EP    0 644 475 A2    3/1995

* cited by examiner

*Primary Examiner*—Lynne H. Browne
*Assistant Examiner*—Stefan Stoynov

(57) ABSTRACT

Systems and methods are discussed to identify a recoverable state in a low power device. A low power device having an arbiter to grant system bus access to a plurality of bus masters is set to initiate a low power mode of operation. A low power controller within the low power device provides a request to the bus arbiter to initiate a low power mode. The bus arbiter stops granting bus requests to the bus masters and identifies when the system bus has processed all current bus accesses. When the system bus is idle, the bus arbiter returns a bus grant signal to the low power controller. Clocks associated with the bus masters are disabled to suspend the bus arbiters and allow less power to be consumed by the low power device.

15 Claims, 11 Drawing Sheets

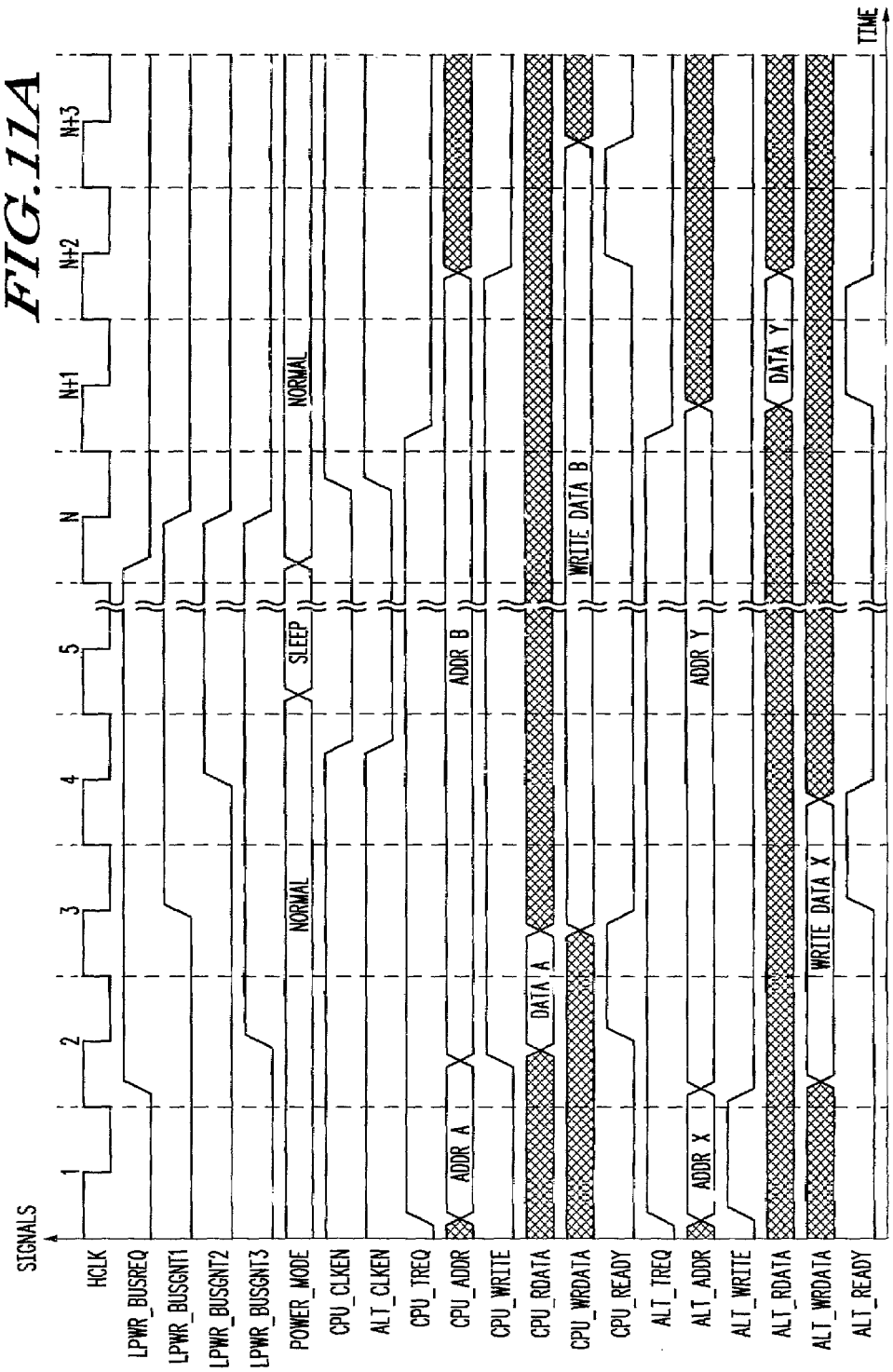

LOW POWER SYSTEM AND METHOD FOR A DATA PROCESSING SYSTEM

FIELD OF THE DISCLOSURE

The present invention relates generally to semiconductor devices and more specifically to systems and method of implementing low power modes for semiconductor devices.

BACKGROUND

The use of low powered portable devices is becoming increasingly common. For example, hand-held device such as cell phones, personal digital assistants (PDA), and the like are becoming increasingly common. Many microprocessor devices have been designed with one or more low power states in order to accommodate power conservation. By conserving power, battery life can be extended, thereby allowing a longer operating time for hand-held devices.

One method of implementing low power states in modem micro-controllers and microprocessors is to provide low power instructions. By executing a low power instruction, the device can initialize a shut down sequence, whereby the device prepares itself for shut down in such a manner that its subsequent return from a low power state can be accomplished. For example, if a low power microprocessor were to be shut down during a memory access cycle, it would be possible to disable the processor prior to an external device, such as a memory, returning the requested data. If upon startup the processor were expecting to see these completed cycle it could result in a lockup of the device since it will be anticipating a memory access which will not occur. However, by executing low power instructions, it is possible for state a machine associated with the processor to shut down in such a manner that it enters, and subsequently exits, low power modes in a known fashion.

While many microprocessor cores support the use of low power instructions to enter low power states in known conditions, the use of such instructions, and other methods is not universally available across all microprocessor cores. When it is desirable to use such microprocessor cores in low power devices, alternative methods for entering low power modes of operation need to be defined. Also, bus master devices such as DMA units and other system function blocks may not execute low power mode instructions directly, and placing such devices in a low power state in a similarly transparent fashion is also a requirement for low power systems. Therefore, the ability to enter a low power mode of operation is an efficient manner would be useful.

BRIEF DESCRIPTION OF THE DRAWINGS

Specific embodiments of the present disclosure are shown and described in the drawings presented herein. Various objects, advantages, features and characteristics of the present disclosure, as well as other methods, operations and functions of related elements of structure, and the combination of parts and economies of manufacture, will become apparent upon considering the following description and claims with reference to the accompanying drawings, all of which form a part of this specification, and wherein:

DETAILED DESCRIPTION OF THE FIGURES

At least one embodiment of the present invention provides a method for placing a device in a low power mode of operation. A low power controller provides a bus request to a bus arbiter to initiate the low power mode. The request is treated with a higher priority than other requests received by the bus arbiter. The bus arbiter stops acknowledging new requests from interfaced bus masters and waits until the system bus has finished processing current bus accesses. Once the system bus is idle, the bus arbiter acknowledges the low power controller bus request, indicating the system is free to engage the low power mode of operation. In one embodiment, the bus masters associated with the bus arbiter are suspended to enable low power consumption. In a specific embodiment of the present invention, the bus arbiter returns a bus grant signal to the low power controller to indicate the low power controller is free to engage the low power mode of operation. In this manner, devices that also act as bus masters can be placed in a recoverable state, wherein such devices are readily shut down in a safe low power mode through the assistance of a bus arbiter.

Figure 1:
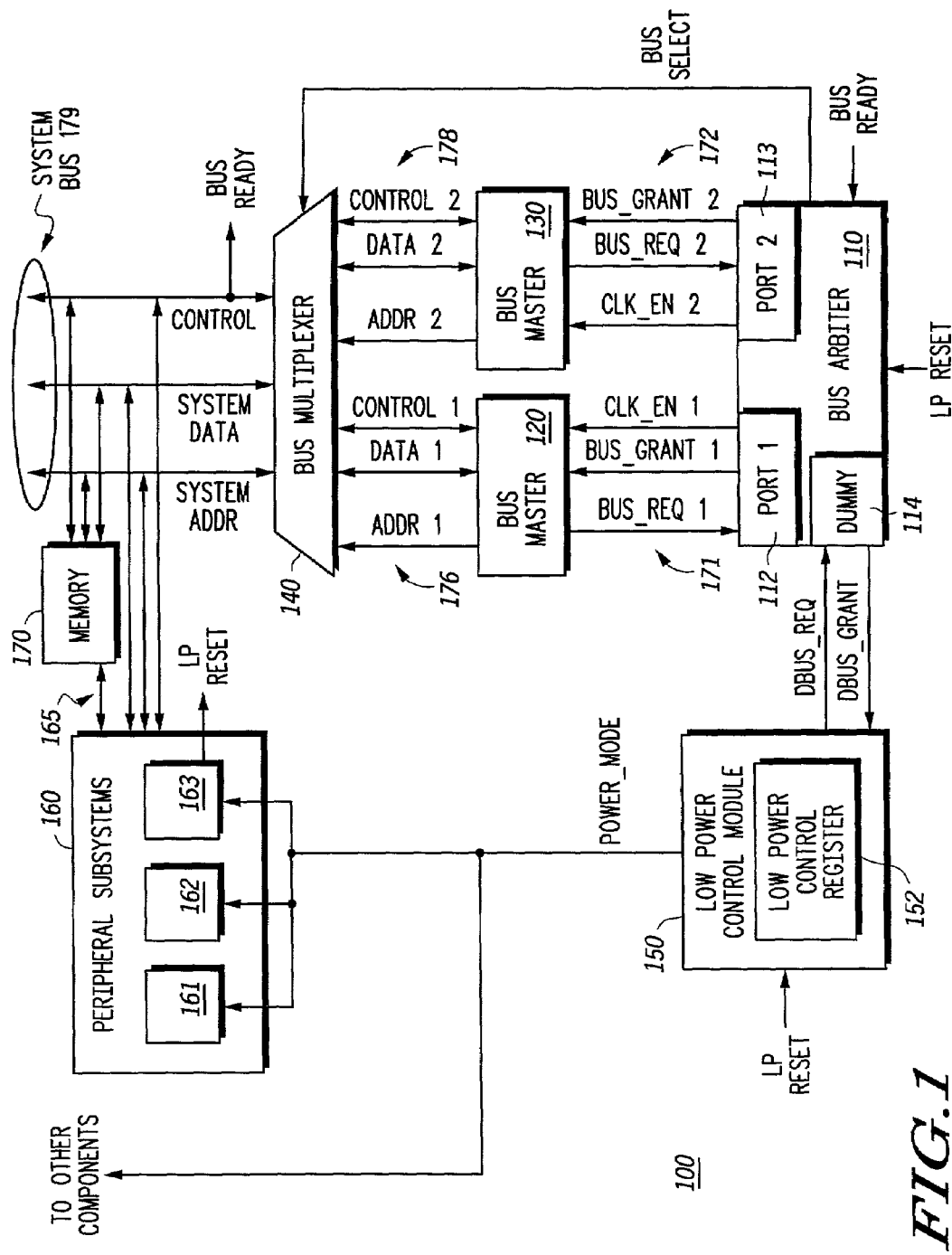
FIG. 1 is a block diagram illustrating a system having multiple bus masters controlled by a bus arbiter, according to one embodiment of the present invention.

FIG. 1 illustrates a portion of a low power device 100. Specific examples of such a low power device can include hand-held personal digital assistants, hand-held communication devices, such as telephones, radios, and other devices. Low power device 100 includes a bus arbiter 110, bus master 120, bus master 130, bus multiplexer 140, low power control module 150, peripheral subsystems 160, and memory 170.

The bus arbiter 110 provides the following signals: bus grant 1 (bus_grant1) and clock enable 1 (clk_en1) to bus master 120; clock enable 2 (clk_en2) and bus grant 2 (bus_grant2) to bus master 130; bus select to bus multiplexer 140; and low power bus grant (dbus_grant) to low power control module 150. Bus master 120 provides the following signals: address 1 (addr1), data 1 (data1), and control 1 to bi-directional bus 176 connected to bus multiplexer 140; and bus request 1 (bus_req1) to bus arbiter 110. Bus master 130 provides the following signals: address 2, data 2, and control 2 to bus 178 between bus multiplexer 140; and bus request 2 (bus_req2) to bus arbiter 110.

Handshake controls 171, associated with the bus master 120 and interfaced with a first port 112 of the bus arbiter 110, include: the bus request 1; a bus grant 1 (bus_grant1), provided by the bus arbiter 110 in response to the bus request 1; and, a clock enable 1 (clk_en1), used to enable or disable clocks in the bus master 120. Similarly, handshake controls 172, associated with the bus master 130 and interfaced with a second port 113 of the bus arbiter 110, include: the bus request 2; a bus grant 2 (bus_grant2), provided by the bus arbiter 110 in response to the bus request 2; and, a clock enable 2 (clk_en2), used to enable or disable clocks in the bus master 130. Bus multiplexer 140 provides information to and from each of the local system buses 176 and 178 that are associated with the bus masters 120 and bus master 130, respectively. In addition, the bus multiplexer 140 provides information to and from the system bus 179. Low power control module 150 provides a low power bus request (dbus_req) to the bus arbiter 110, and a power mode indicator (power_mode) to peripheral subsystems 160, and to the rest of low power device 100. The peripheral subsystems 160 interface to a memory 170 via a bus interface 165, and provide a low power reset (lp reset) to the low power control module 150. The memory 170 interfaces to the system bus 179 and to peripheral subsystems 160 via bus interface 165. Peripheral subsystems 160 also interface to system bus 179.

In operation, the low power control module 150 initiates a low power mode of low power device 100. Low power control module 150 includes a low power control register 152. In one embodiment, low power control module 150 determines when low power device 100 is to be set into the low power mode based on a value of low power control register 152. When low power device 100 is to enter a low power mode, low power control register 152 is set. For example, an application (not shown), or a subsystem of peripheral subsystems 160, monitoring user activity of low power device 100, can set low power control register 152 when the user has not activated a user interface, such as a key pad (not shown). Alternatively, low power control register 152 can be set when power cells (now shown) use to power low power device 100 are low, allowing low power device 100 to be placed in the low power mode. Accordingly, a user can be given time to take means necessary to replace the power cells or to backup desired data. In addition, in some embodiments, low power control register 152 may be interfaced to system bus 179 to allow access to low power control register 152 by means of bus transfers.

Once low power control module 150 has detected that low power control register 152 has been set, low power control module 150 may provide a low power bus request (dbus_req) to bus arbiter 110. The low power bus request represents a bus request signal provided to the bus arbiter 110 in which the request is not used for accessing the system bus 179, but to provide an indication to the bus arbiter 110. Similarly, the low power bus grant signal provided by the bus arbiter 110 is used to acknowledge the low power bus request. In one embodiment, after asserting low power bus request, dbus_req, to bus arbiter 110, low power control module 150 waits for receipt of dbus_grant signal from bus arbiter 110.

When low power control module 150 has received the dbus_grant signal, low power control module 150 can provide the power mode indicator to place peripherals subsystems 160 and other portions of low power device 100 into a low power state. In one embodiment, low power control module 150 applies settings to reduce power provided to peripheral subsystems 160. In one embodiment, low power control module 150 waits for a low power reset signal (LP RESET), indicating low power device 100 is to be taken out of a low power mode and into a nominal power mode. Accordingly, low power control module 150 can return peripheral subsystems 160 to a normal mode of operation in response to the low power reset signal. The nominal power mode represents a normal mode of operation in which general functionality of low power device 100 is available. Furthermore, while in the nominal mode of operation, the low power device 100 can consume a normal amount of power, greater than an amount of power consumed in the low power mode of operation. It should be appreciated that other methods of identifying a low power mode can be employed without departing from the scope of the present invention. Furthermore, low power control module 150 can take other means to place low power device 100 in a low power mode than discussed herein. In addition, alternate means of indicating that a low power mode is to be exited, rather than low power reset (LP RESET) may be employed, without departing from the scope or spirit of the present invention.

The bus arbiter 110 is used to receive requests from a plurality of requestors, such as bus master 120, bus master 130 and low power control module 150, and to grant one of the requesters, bus master 120 or 130, access of system bus 179. In one embodiment, bus arbiter 110 utilizes an arbitration scheme to recognize bus access requests from either the first port 112, associated with bus master 120, or the second port 113, associated with bus master 130. For example, the bus arbiter 110 can utilize a round-robin arbitration, in which the bus arbiter 110 alternates between granting requests from the first port 112 or the second port 113. Once a port is selected, first port 112 or second port 113, bus arbiter 110 provides the bus grant signal, bus grant 1 or bus grant 2, to an associated bus master, such as bus master 120 or bus master 130, respectively. In one embodiment bus master 110 also provides a control signal to bus multiplexer 140 to receive information, such as address, data and control signals from one of the available bus masters, bus master 120 or bus master 130, associated with the selected port, first port 112 or second port 113, respectively. Bus master 120 and bus master 130 represent bus master devices. For example, bus masters 120 and 130 can include a processor built into low power device 100, such as a central processing unit (CPU). Bus masters 120 and 130 can also include a direct memory access (DMA) engine or other processors.

In one embodiment, bus arbiter 110 includes a low power port 114 to receive the low power bus request signal from low power control module 150. The bus arbiter 110 can treat requests from the low power control module 150 as an additional requestor. For example, bus arbiter 110 can arbitrate among requests received through the first port 112, the second port 113 and the low power port 114. In one embodiment, when bus arbiter 110 accepts the low power bus request signal, bus arbiter 110 awaits for a bus ready signal. The bus ready signal is a signal used by the system bus 179 to indicate when pending requests on system bus 179 have been processed. Once the bus ready signal is received, bus arbiter 110 can provide the low power bus grant signal to the low power control module 150, indicating low power device 100 can be set in a low power mode.

In the illustrated embodiment, when bus arbiter 110 provides the low power bus grant signal to low power control module 150, bus arbiter 110 also utilizes the clock enable signals, clock enable 1 and clock enable 2, to disable clocks associated with bus master 120 and bus master 130, respectively. In one embodiment, once the system bus 179 has processed the pending requests, the bus masters 120 and 130 are considered to be in a recoverable state, since bus masters 120 and 130 are not awaiting a response from the system bus 179. By disabling clocks to the bus masters 120 and 130, bus arbiter 110 can keep the bus masters 120 and 130 in the recoverable state for low power operation. Furthermore, bus arbiter 110 can initiate a mode of operation in which further requests from the first port 112 and the second port 113 are not acknowledged. Bus arbiter 110 can wait until the low power reset signal is asserted to determine when to return to the normal mode of operation. Accordingly, when the low power reset signal is asserted, bus arbiter 110 can re-enable clocks to the bus masters 120 and 130, using the clock enable 1 and clock enable 2 signals, and return to arbitrating between accepting requests from the first port 112 and the second port 113.

In an alternate embodiment, bus arbiter 110 may not be responsive to low power reset signal LP RESET directly, but instead may simply wait for the negation of the low power bus request via port 114 to indicate that low power mode of operation is no longer desired, and a return to normal mode should occur.

In one embodiment, bus arbiter 110 is further capable of prioritizing received requests. For example, it may be desirable to enter a low power mode as soon as possible. Accordingly, bus arbiter 110 can process the low power bus request from low power port 114 out of turn, ignoring new requests from bus master 120 and bus master 130. By prioritizing the low power bus request from low power control module 150 over bus access requests from bus masters 120 and 130, the bus arbiter 110 can ensure the low power mode is executed quickly. Priority can be changed to suit the needs of low power device 100. For example, if a less stringent low power execution is desired, the low power bus request received through low power port 114 can be prioritized below requests from bus master 120 but above request from bus master 130. Alternatively, priority associated with low power port 114 can be set at a fixed priority.

Bus multiplexer 140 is used to couple system bus 179 with local buses 176 and 178, associated with bus master 120 and 130, respectively. In one embodiment, the bus master to be selected by bus multiplexer 140 is identified through the bus select signal provided by bus arbiter 110. For example, if the bus select signal indicates bus master 120 is to be selected, bus multiplexer 140 will couple the address 1, data 1, and Control 1 signal lines from local bus 176 with system address, system data, and control lines of system bus 179, respectively. Alternatively, if the bus select signal indicates bus master 130 is to be selected, bus multiplexer 140 can couple address 2, data 2 and control 2 lines of local bus 178 with system address, system data and control lines of system bus 179.

System bus 179 can be used to couple bus masters 120 and 130 with memory 170, peripheral subsystems 160, and other system components (not shown). Accordingly, bus master 120 and 130 can provide data to be written to or read from components of low power device 100, such as memory 170 and peripherals 160, connected to system bus 179. In one embodiment, address information and data sent along system bus 179 is interleaved. An address transmitted on the system address line of system bus 179 indicates a bus address to write in a next set of data from the system data lines of system bus 179. While the data is accessed on the system data lines, a new address can be placed on the system address lines indicating a new address for a new set of data. It should be appreciated that other forms of passing address information and data along a system bus, such as system bus 179, can be incorporated without departing from the scope of the present invention.

Peripheral subsystems 160 are coupled to system bus 179, and may be coupled to memory 170 through bus interface 165. Peripheral subsystems 160 include several components for handling cross-sections of low power device 100. For example, a first subsystem 161 can be used to process video for low power device 100. A second subsystem 162 can be used to process audio for low power device 100. In addition, a third subsystem 163 can be used to process user interfacing, such as user input to a keypad. Subsystems 161 through 163 can be placed in a power down mode in response to the low power mode indicator provided by low power control module 150. It should be appreciated, that not all subsystems may be desired to be powered down. For example, subsystem 163 can be used to monitor user input during the low power mode. Accordingly, when the user attempts to access low power device 100, such as by tapping on a keypad, the third subsystem 163 can assert the low power reset signal to recover low power device 100 from the low power mode and return to a nominal mode of operation. It should be appreciated that other subsystems can be used in addition to or in place of those discussed with regard to peripheral subsystems 160. Furthermore, other means of detecting when to return from a low power mode can be used without departing from the scope of the present invention.

Figure 2:
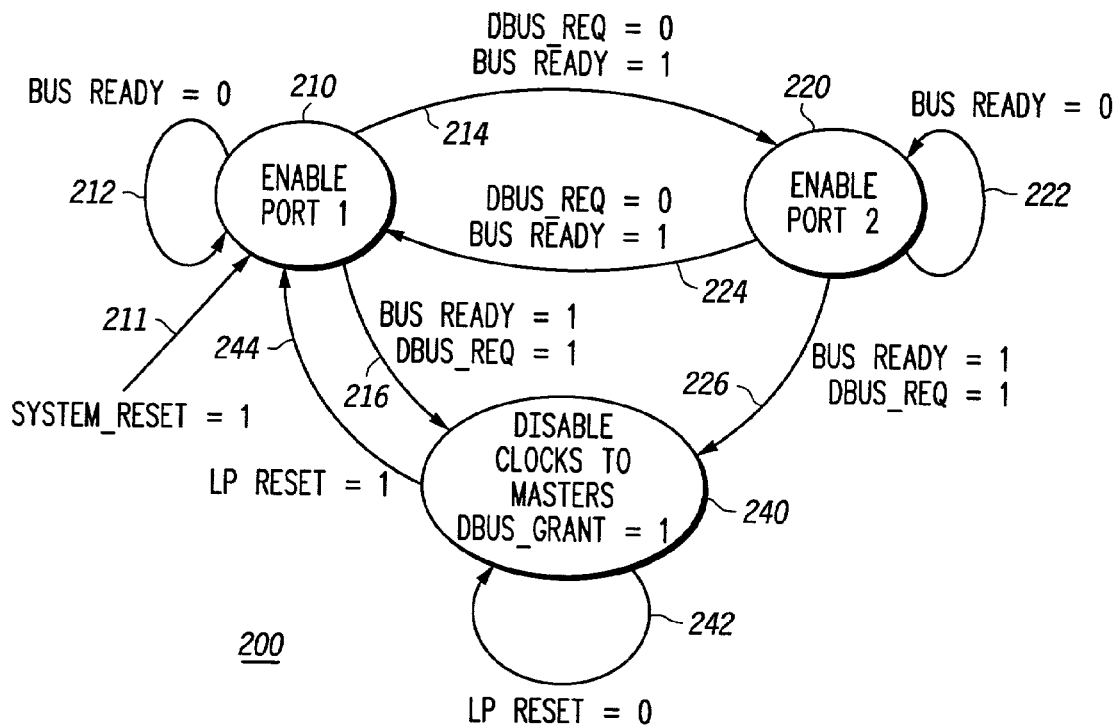
FIG. 2 is a state diagram representing specific functionality of a portion of the bus arbiter of FIG. 1, according to one embodiment of the present invention.

Referring now to FIG. 2, a state diagram representing specific functionalities of a portion of the bus arbiter of FIG. 1 is shown and referenced generally as state diagram 200, according to one embodiment of the present invention. Bus arbiter 110 (FIG. 1) identifies a current requester, such as bus masters 120 and 130 (FIG. 1), to grant bus access to. A control device, such as low power control module 150 (FIG. 1) is treated as an additional requester. Bus arbiter 110 can be used to grant low power execution of a low power device only when pending bus accesses on a system bus of the low power device have been processed. In one embodiment, the bus arbiter switches between a first port associated with a first bus master and a second port associated with a second bus master, according to an arbitration scheme, such as round-robin arbitration. Requests for the low power control device are treated with a higher priority than requests from the bus masters. Accordingly, a request from the control device to enter a low power mode can be executed as soon as possible.

In one embodiment, upon startup or reset, such as according to an assertion of a system reset signal (SYSTEM_RESET), the bus arbiter begins in state 210, via a path 211. In state 210, the bus arbiter enables the first port for granting access to the first bus master. If a request for a bus access is pending on the first port in state 210, the bus arbiter grants the bus access request. As previously discussed, to grant the request to the first bus master, the bus arbiter asserts a bus grant signal to the first bus master and provides a bus select signal to a bus multiplexer to couple local bus lines associated with the first bus master with the system bus. In one embodiment, the bus arbiter remains in state 210, via a path 212, while a bus ready signal is set to an off or a '0' value, indicating the system bus is busy processing the current request. Alternatively, if the bus ready signal is set to an on state and a low power bus request (DBUS_REQ) signal from the control device is not asserted, the bus arbiter follows a path 214 to state 220. Within state 220, the bus arbiter enables the second port to grant accesses to the second bus master. Similar to state 210, if a request from the second bus master is on the second port, the bus arbiter grants the request and remains in state 220 according to a path 222, until the bus has processed the request. Once the bus ready signal is asserted, or if no request was pending on the second port, the bus arbiter may return to state 210 according to a path 224. Accordingly, the bus arbiter can switch between the first port and the second port, processing available requests in a round-robin fashion until the low power bus request signal from the control device is asserted.

While in states 210 and 220, if the low power bus request signal from the control device is asserted and the bus ready signal is asserted, the bus arbiter switches to a state 240, via a path 216 or path 226, respectively. While in state 240, the bus arbiter begins execution of a low power mode. In one embodiment, the bus arbiter is able to disable clocks associated with the bus masters, such as the first and second bus master. The bus arbiter can also provide a request grant signal (DBUS_GRANT) to the control device to indicate the bus masters and the low power device are in a recoverable state and the control device can place other components of the low power device in a low power mode. The bus arbiter may remain in state 240 until a low power reset signal is asserted according to a path 242. In one embodiment, the low power reset signal indicates a low power device is to be recovered from low power execution. If the low power reset signal is asserted during state 240, the bus arbiter can return to state 210 through path 244 to continue arbitration between the first port and the second port. It should be appreciated that other methods of arbitrating between bus masters and the control device may be implemented without departing from the scope of the present invention.

Figure 3:
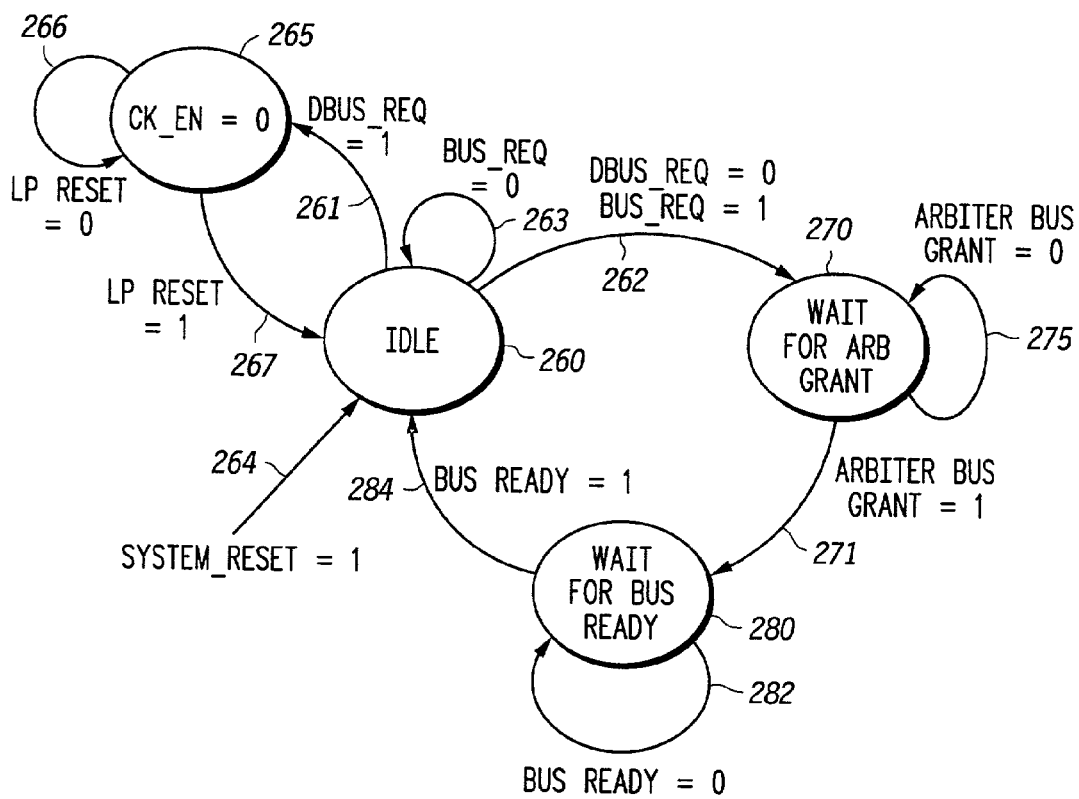
FIG. 3 is another state diagram implementing specific embodiment to functionality for a portion of the bus arbiter of FIG. 1, according to one embodiment of the present invention.

Referring now to FIG. 3 another state diagram representing specific functionality of a portion of the bus arbiter of FIG. 1 is shown, according to one embodiment of the present invention. Different ports associated with the bus arbiter are used for processing requests among different bus masters, such as port 112 of bus arbiter 110 (FIG. 1). A particular bus port can remain in an idle state 260 until either a bus request is received from an associated bus master or a low power bus request is received, indicating a low power mode is to be initiated.

In one embodiment, a bus port begins processing in or is reset, such as according to an assertion of a reset signal (SYSTEM_RESET), to the idle state 260, via a path 264. While in idle state 260, the bus port waits for an assertion of either the low power bus request signal or a bus request signal (BUS_REQ), from the associated bus master. If the bus request signal is not asserted, the bus port remains in state 260, via a path 263. If the bus request signal is asserted and the low power bus request signal is not asserted, the bus port transitions to state 270, through path 262. In state 270, the bus port waits for a grant signal from the bus arbiter. If the bus grant signal is not asserted by the arbiter, the bus port remains in state 270, according to a path 275. Once the bus grant signal is asserted, the bus port asserts the bus grant signal to the associated bus master. The bus port then transitions to a state 280, according to a path 271. In state 280 the bus port waits for a bus ready signal, indicating the granted bus request has completed. The bus port remains in state 280 while the bus ready signal is not asserted according to path 282. When the bus ready signal is asserted, the bus port transitions back to state 260 according to path 284.

If the low power bus request signal is asserted while the bus port is in idle state 260, the bus part transitions to a low power state 265 via path 261. In low power state 265, the bus port de-asserts a clock enable signal provided to the associated bus master. Accordingly, while the bus port is in state 265, a clock associated with the bus master is disabled allowing the bus master to be placed in a low power mode. The bus port remains in the low power state 265 while a low power reset signal (LP RESET), is de-asserted and in a '0' or off state, according to a path 266. When the low power reset signal is asserted, the bus port can transition back to the idle state 260, according to path 267. Accordingly, once the bus port has transitioned back to the idle state 260, the clock enable signal can be reasserted, allowing the clock of the associated bus master to be re-enabled.

Figure 4:
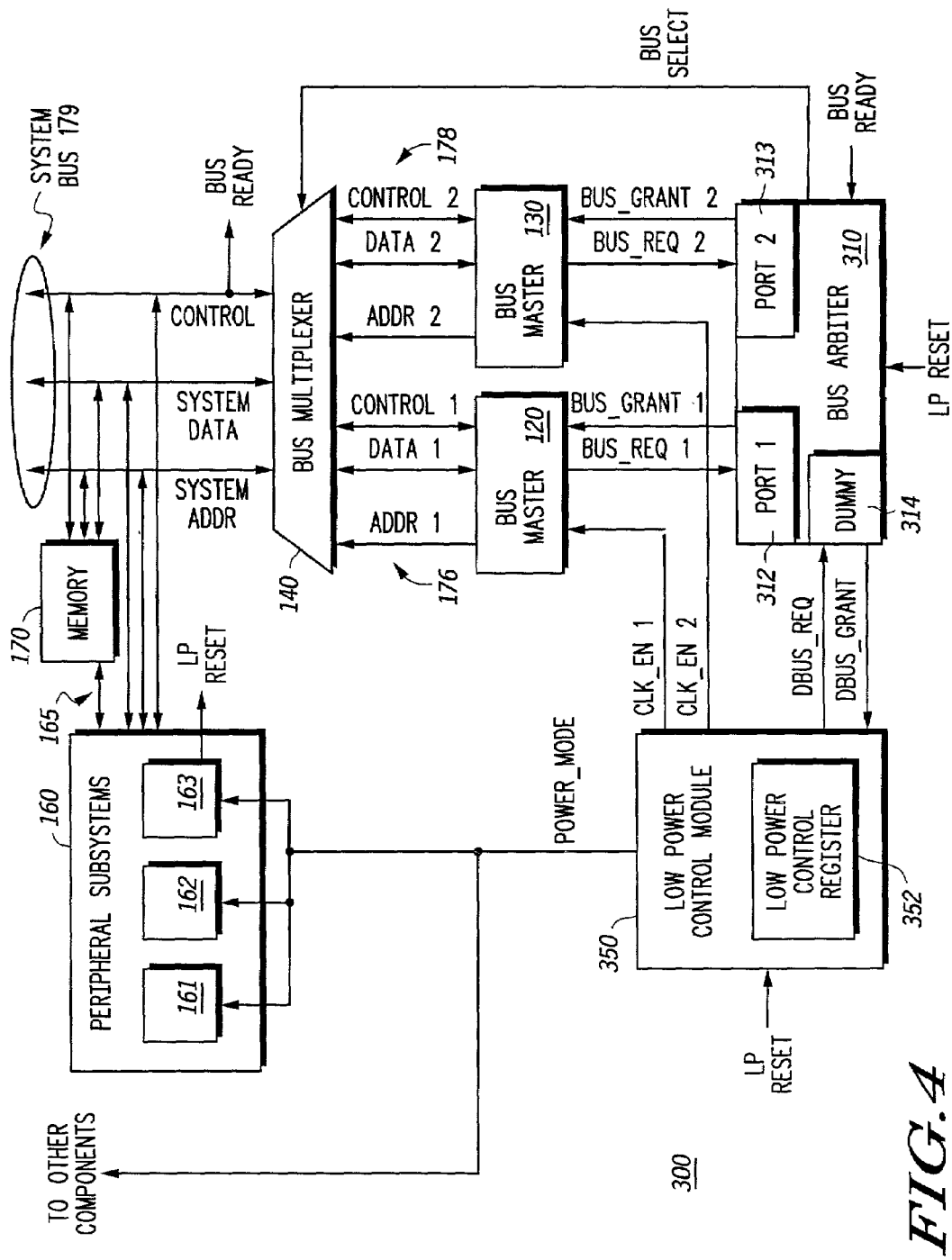
FIG. 4 is a block diagram illustrating a system having multiple bus masters and a bus arbiter, according to one embodiment of the present invention.

Referring now to FIG. 4, a block diagram illustrating a system having multiple bus masters and a bus arbiter is shown and referenced generally as device 300, according to one embodiment of the present invention. Low power device 300 operates similar to low power device 100 of FIG. 1. A bus arbiter 310 selects one of bus master 120 or bus master 130 to grant access of system bus 179. A low power control module 350 initiates a low power mode of low power device 300. Bus arbiter 310 is used to identify when the low power device 300 is in a recoverable state for a low power mode of operation.

Difference between the operation of low power device 300 and low power device 100 is noted in the operation of low power control module 350 in comparison to low power control module 150 (FIG. 1), and bus arbiter 310 in comparison to bus arbiter 110 (FIG. 1). Specifically, where a clock enable signal was provided by bus arbiter 110 to enable and disable clocks associated with bus masters 120 and 130 in low power device 100, it is the low power control module 350 which provides the clock enable signals in low power device 300.

Low power control module 350 monitors a setting of low power control register 352. Low power control register 352 operates similar to low power control register 152 (FIG. 1). An external component sets at least a portion of the low power control register 352 when it is determined that low power device 300 is to be placed in a low power mode of operation. When low power control register 352 is set, low power control module 350 provides the low power bus request signal to bus arbiter 310, through low power port 314. Low power control module 350 waits for the low power bus grant signal from bus arbiter 310. Upon receipt of the low power bus grant signal from bus arbiter 310, low power control module 350 disables clocks and bus masters 120 and 130, through the clock enable signals, clk_en1 and clk_en2, as will subsequently be discussed.

In one embodiment, low power control module 350 disables clocks in both bus masters 120 and 130. Alternatively, low power control module 350 may disable clocks in only one of bus master 120 or bus master 130. For example, if operations performed by bus master 120 are critical and should not be disabled during a low power mode, low power control module can disable only clocks associated with bus master 130. Low power control module 350 can also provide the power mode indicator to peripheral subsystems 160 and other components of low power device 300. Accordingly, peripheral subsystems 160 and other components of low power device 300 can be set to a low power mode of operation. It should be appreciated, that other actions can be taken to place low power device 300 into a low power mode of operation without departing from the scope of the present invention. Furthermore, other methods of disabling bus master 120 and bus master 130 can be employed without departing from the scope of the present invention.

As previously discussed, bus arbiter 310 selects one of bus master 120 or bus master 130 to be granted access to system bus 179. Bus arbiter 310 can follow an arbitration technique to recognize requests from either the first port 312 associated with bus master 120 or the second port 313 associated with bus master 130. Furthermore, bus arbiter 310 can select to process request from low power control module 350 through low power port 314. In one embodiment, when bus arbiter 310 recognizes the low power bus request signal through low power port 314, bus arbiter 310 waits for a bus ready signal from system bus 179 to be asserted. Bus arbiter 310 can provide the low power bus grant signal to low power control module 350 in response to the assertion of the bus ready signal, indicating all pending requests have been processed by system bus 179 and low power device 300 is in a recoverable state for entering a low power mode of operation.

Figure 5:
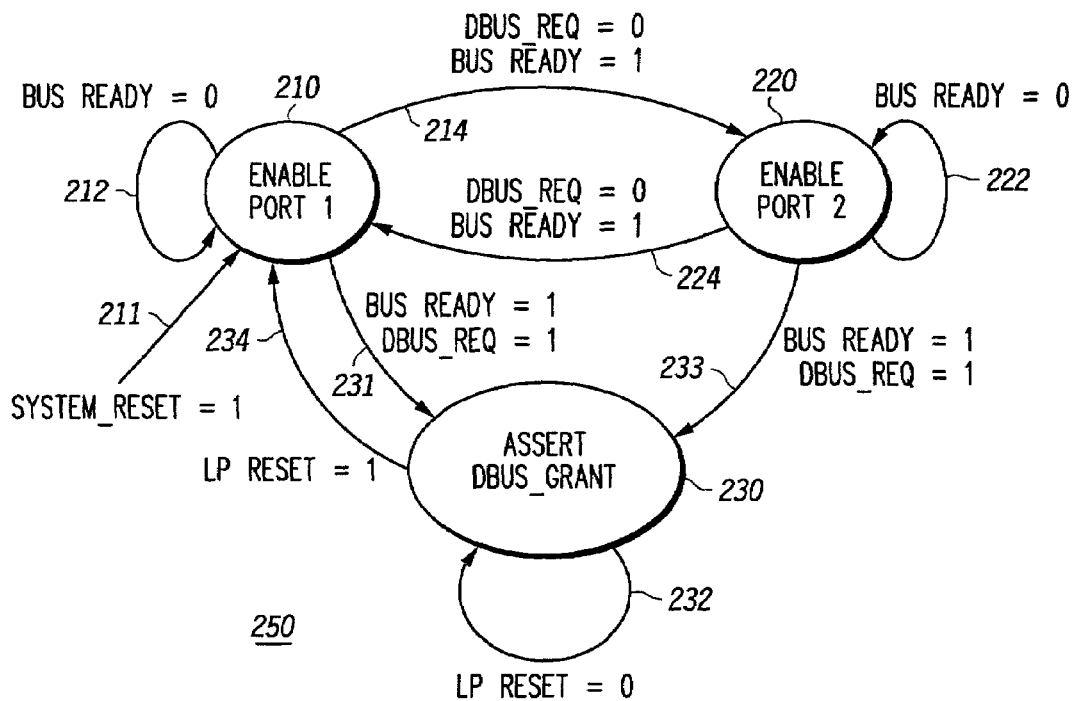
FIG. 5 is a state diagram implementing another specific embodiment of the bus arbiter of FIG. 4, according to one embodiment of the present invention.

Referring now to FIG. 5, a state diagram implementing a specific embodiment of the bus arbiter of FIG. 4 is shown and referenced generally as state diagram 250, according to one embodiment of the present invention. The bus arbiter switches between enabling a first port, associated with first bus master, and a second port, associated with the second bus master. In the illustrated embodiment, the bus arbiter utilizes a round-robin arbitration to select between available ports.

State diagram 250 operates similar to state diagram 200 of FIG. 2. When the low power bus request signal is not asserted, the bus arbiter switches between state 210, used to enable the first port, and state 220 used to enable the second port. In one embodiment, when a bus ready signal and the low power bus request signal are both asserted, the bus arbiter switches from either state 210 or state 220 to state 230, via a path 231 or path 233, respectively. Instate 230, the bus arbiter asserts a low powerbus grant signal to indicate a low power device associated with the bus arbiter is in a recoverable state and can be placed in a low power mode of operation. While in state 230, the bus arbiter waits for a low power reset signal to be asserted. The low power reset signal indicates the low power device associated with the bus arbiter is to return to a normal mode of operation. While the low power reset signal is set to an off state or a value of '0', the bus arbiter remains in state 230, via path 232. Alternatively, when the low power reset signal is asserted, the bus arbiter returns to state 210 via path 234, allowing the bus arbiter to arbitrate between accepting requests from one of the available bus masters.

Figure 6:
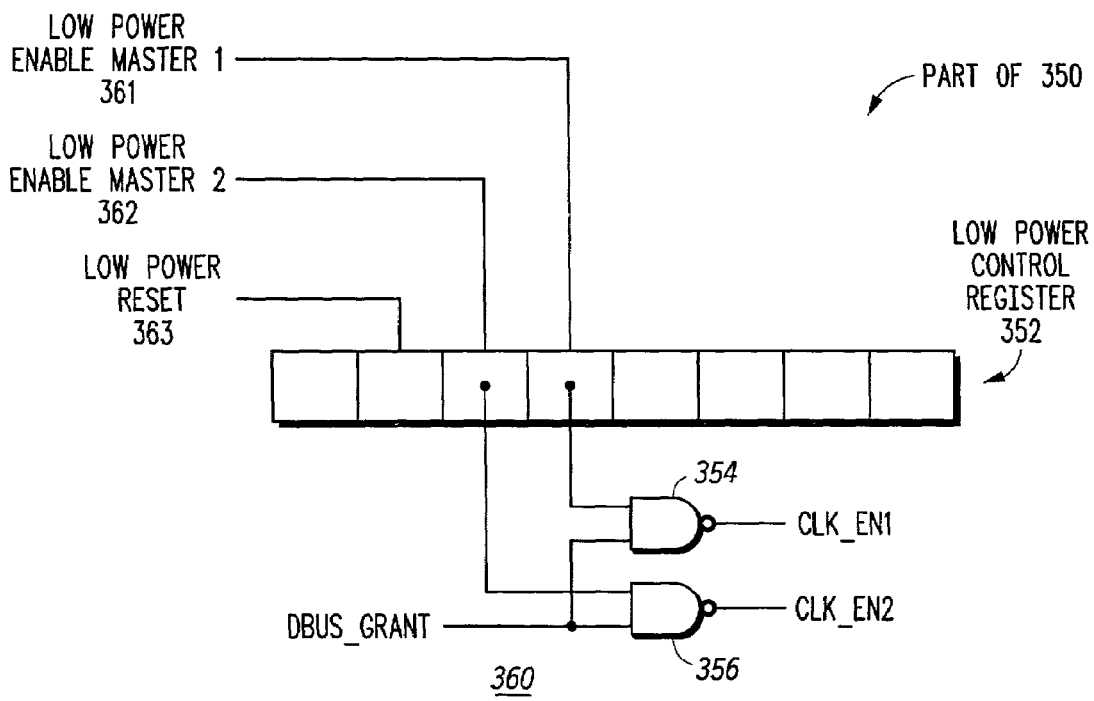
FIG. 6 is a block diagram illustrating a specific portion of a low power control module of FIG. 4 that includes a register, according to one embodiment of the present invention.

Referring now to FIG. 6, a block diagram illustrating a specific part of the low power control module 350 of FIG. 4 is shown and is referenced generally as block diagram 360, according to one embodiment of the present invention. Block diagram 360 includes a control register, low power control register 352, for enabling low power operations within a low power device, such as low power device 300 of FIG. 4. Specifically, block diagram 360 can be used to assert and de-assert clock enable signals, clock enable 1 (clk_en1) and clock enable two (clk_en2) used by low power control module 350 to enable and disable bus master 120 and bus master 130 (FIG. 1), using nand gates 354 and 356.

A first nand gate 354 is used to provide the clock enable 1 signal to bus master 120. In operation, when either a low power enable master 1 bit 361 of control register or the low power bus grant signal are at an off state or are set to a '0' value, nand gate 354 provides an asserted clock enable 1 signal to bus master 120, enabling clocks associated with the bus master 120. Alternatively, when both the low power enable master 1 bit 361 and the low power bus grant signal are asserted or in an 'on' state, nand gate 354 sets clock enable 1 to an off state, disabling clocks within the bus master 120. Similarly, a nand gate 356 can enable or disable clocks in bus master 130 by asserting or de-asserting the clock enable 2 signal, based on values of the low power enable master 2 bit 362 of the low power control register 352 and the low power bus grant signal. A low power reset bit 363 is set by an assertion of a low power reset signal. The low power reset signal is used by a subsystem, such as subsystem 163 of low power device 300, to indicate when low power device 300 is to be placed back in the normal mode of operation. It should be appreciated that other methods of generating the clock enable signals, such as clock enable 1 and clock enable 2, can be implemented without departing from the scope of the present invention.

Figure 7:
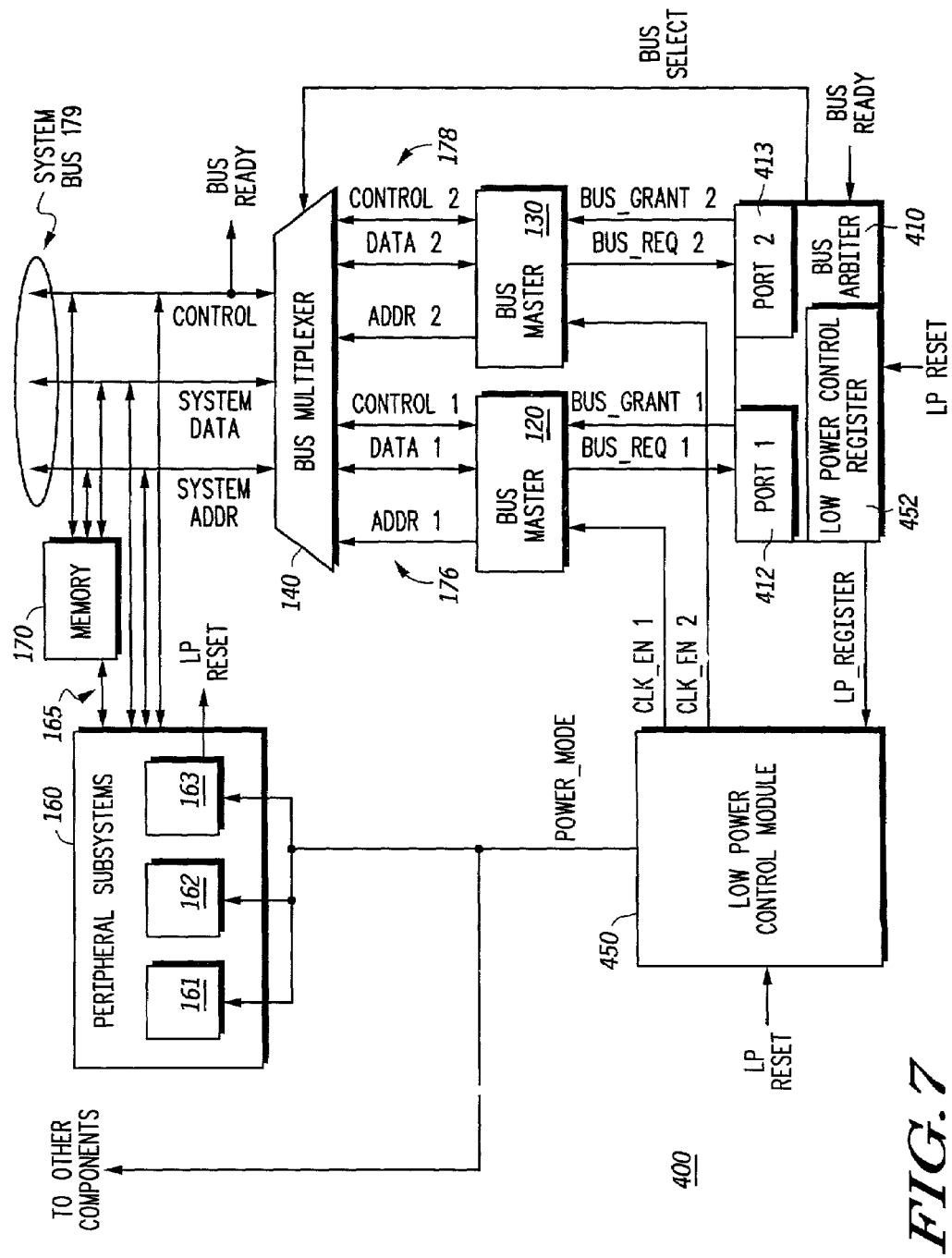
FIG. 7 is a block diagram illustrating a system having multiple bus masters controlled by bus arbiter, according to one embodiment of the present invention.

Referring now to FIG. 7 a block diagram illustrating a system having multiple bus masters controlled by a bus arbiter is shown and referenced generally as low power device 400, according to one embodiment of the present invention. Low power device 400 operates similar to low power device 300. A bus arbiter 410 identifies a recoverable state wherein low power device 400 can be placed in a low power mode of operation. The bus arbiter 410 provides a low power enable signal to a low power control module 450, indicating a low power mode has been initiated. In response to a low power enable signal (LP_ENABLE), low power control module 450 may disable clock to bus master 120 and bus master 130.

While the low power control module 350 of low power device 300 (FIG. 4) was used to identify when a low power mode was initiated in FIG. 4, in FIG. 7 it is the bus arbiter 410 that identifies when low power is initiated in low power device 400. Bus arbiter 410 selects between granting bus requests to bus master 120 or bus master 130, through ports 412 and 413, respectively. Bus arbiter 410 can select to grant requests from port 412 or port 413 using an arbitration scheme, such as round-robin arbitration. In the illustrated embodiment, bus arbiter 410 includes a low power control register 452. Components or a subsystem of low power device 400, external to bus arbiter 410, can set low power control register 452 to a particular value to indicate low power device can be set to a low power mode of operation. Alternatively, bus arbiter 410 can identify when the low power mode should be initiated. When low power control register 452 has been set, bus arbiter 410 waits for low power device 400 to be in a recoverable state. In one embodiment, bus arbiter 410 stops granting bus requests associated with the bus masters 120 and 130 and waits for an assertion of a bus ready signal from system bus 179. As previously discussed, the bus ready signal indicates system bus 179 has completed processing all pending bus requests. Accordingly, the low power device 400 can be placed in a shut down or low power mode without a loss of data or an incomplete transfer along system bus 179. In the illustrated embodiment, bus arbiter 410 further provides a low power enable signal to low power control module 450.

Low power control module 450 provides clock enable signals, clock enable 1 and clock enable 2, to bus master 120 and 130. The clock enable signals are used to enable and disable clocks associated with the bus masters 120 and 130. When the low power control module 450 receives the low power enable signal (LP_ENABLE) from bus arbiter 410, the low power control module 450 can de-assert or place the clock enable signals in an off state. Accordingly, low power control module 450 can disable clocks in bus master 120 and 130 when the low power enable signal is asserted. Similarly, when the low power enable signal is asserted, low power control module can further provide the power mode indicator to peripheral subsystems 160, indicating subsystems 161–163 can be placed in a shut down or low power mode of operation. The low power control module 450 can also indicate to other portions of low power device 400 that a low power mode is active.

A low power reset signal can be used to awaken low power device 400 from the low power mode. When the lower power reset signal is asserted, low power control module 450 can re-enable clocks in the bus masters 120 and 130 by reasserting the clock enables, clock enable 1 and clock enable 2. Furthermore, low power control module 450 can alter the value of the power mode indicator to notify peripherals subsystems 160 and other portions of low power device 400 to return to a normal mode of operation. When the low power reset signal is asserted, bus arbiter 410 can de-assert the low power enable signal and continue to arbitrate between port 412 and port 413.

Figure 8:
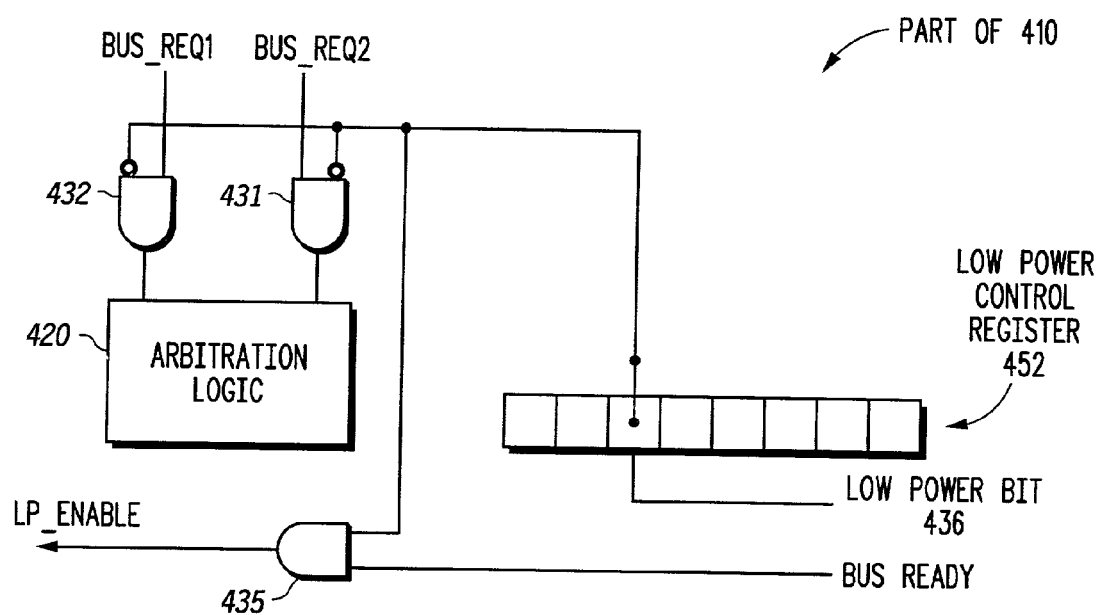
FIG. 8 is a block diagram illustrating a portion of the bus arbiter of FIG. 7 that includes logic for gating bus requests signals, according to one embodiment of the present invention.

Referring now to FIG. 8, a portion of the bus arbiter of FIG. 7 including logic for gating bus request signals is shown, according to one embodiment of the present invention. The illustrated portion of bus arbiter 410 includes a low power control register 452 to indicate when a low power mode has been initiated, an AND gate 432 to pass or block a request, bus request 1 (bus_req1), associated with a first bus master, such as bus master 120, an AND gate 431 to pass or block a request, bus request 2 (bus_req2), associated with the second bus master, such as bus master 130. A set of arbitration logic 420 is used to select requests passed by AND gate 432 or AND gate 431. The illustrated portion of bus arbiter 410 includes an AND gate 435 to assert a low power enable signal, indicating a device, such as low power device 400, may be placed in a low power mode of operation.

In operation, AND gates 432 and 431 block both requests, bus request 1 and bus request 2, when a low power bit 436 of low power control register 452 is asserted. When the low power bit 436 is in an off state, AND gates 432 and 431 pass the requests, bus request 1 and bus request 2. Accordingly, arbitration logic 420 is only able to receive bus requests when the low power bit 436 is not asserted. The AND gate 435 asserts the low power enable signal only when the bus ready signal and low power bit 436 are both asserted. As previously discussed, the bus ready signal is only asserted when a system bus, such as system bus 179 (FIG. 7), has finished processing all pending bus requests.

Figure 9:
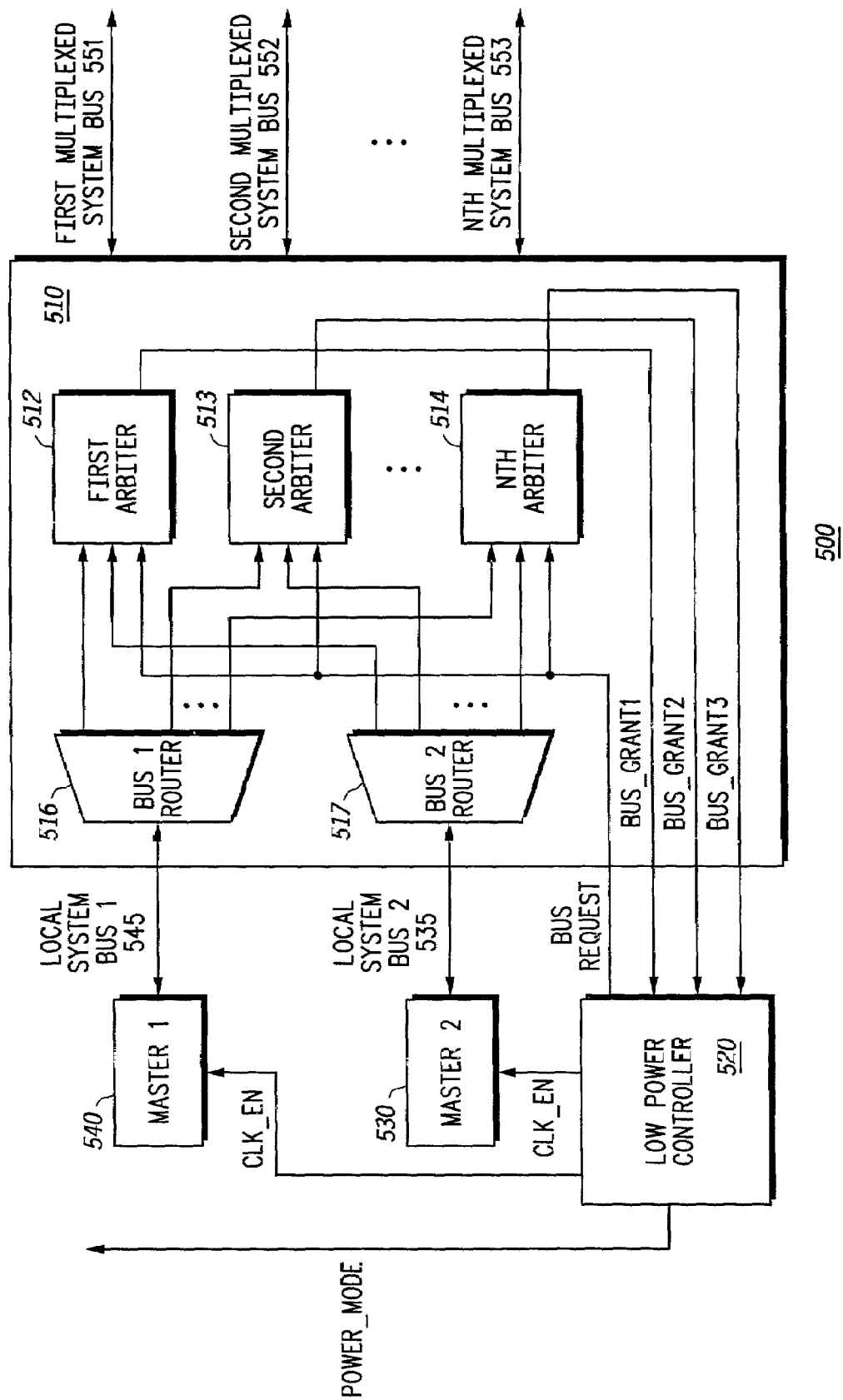
FIG. 9 is a block diagram illustrating a system having multiple bus masters and bus multiple arbiters, according to one embodiment of the present invention.

Referring now to FIG. 9, a block diagram representing a system having multiple bus masters and multiple bus arbiters is shown and referenced generally as system 500, according to one embodiment of the present invention. System 500 includes a first bus master 540 and a second bus master 530 providing requests to a crossbar switch 510. The crossbar switch 510 processes the requests to one of a plurality of multiplexed system buses, including a first multiplexed system bus 551, a second multiplexed system bus 552 and an nth multiplexed system 553. In one embodiment, the crossbar switch 510 includes a first bus router 516 coupled to a local system bus 545 of bus master 540 and a second bus router 517 coupled to a local system bus 535 of the second bus master 530. The bus routers 516 and 517 process received requests through one of a plurality of arbiters, including a first arbiter 512, and second arbiter 513 and an nth arbiter 514. Each arbiter of the plurality of arbiters is associated with a multiplexed system bus of the plurality of multiplexed system buses. A low power controller 520 is used to identify when the low power mode is to be initiated and can disable clocks associated with the bus masters 530 and 540 to place the bus masters 530 and 540 in a low power mode.

Crossbar switch 510 processes requests from the bus masters 540 and 530 to an associated system bus. The first bus router 516 identifies system buses associated with the bus master 540. In one embodiment, the bus router 516 identifies the associated system bus by the address associated with the request from bus master 540. For example, a first block of addresses can be associated with the first multiplexed system bus 551 and a second block of addresses can be associated with a second multiplexed system bus 552. The bus router 516 provides the request to an arbiter associated with the identified multiplexed system bus. For example, if the request is associated with the first multiplexed system 551, the bus router 516 provides the request to the first arbiter 512 and if the request is associated with the second multiplexed system bus 552, the bus router 516 provides the request to the second arbiter 513. Similarly, the second bus router 517 will provide requests received from the bus master 530 to one of the plurality of arbiters. The arbiters 512 through 514 each select among requests received from bus router 516 and/or bus router 517. Once an arbiter, such as first arbiter 512, has selected a request, the crossbar switch 510 provides the request to the associated multiplexed system bus, such as first multiplexed system bus 551. In one embodiment, the arbiters 512–514 are further capable of receiving requests from the low power controller 520. It should be appreciated that while system 500 is described having two bus masters, bus masters 540 and 530, other bus masters may be included and the number of supported bus masters can be altered without departing from the spirit and scope of the present invention.

The low power controller 520 initiates low power operation within system 500. In one embodiment, subsystems of system 500 are capable of asserting a signal or a register value associated with low power controller 520 to indicate when a low power mode is to be initiated. When the low power controller 520 identifies that the low power mode is to be initiated, the low power controller 520 provides bus requests to each of the arbiters 512–514. The bus arbiters 512–514 return bus grant signals, BUS_GRANT 1, BUS_GRANT 2 and BUS_GRANT 3, to the low power controller 520 when the bus requests from the low power controller 520 have been accepted. The bus grant requests indicate the respective multiplexed system buses 551–553, associated with the arbiters 512–514, have processed all pending requests. In one embodiment, the low power controller 520 waits until bus grants from all of the arbiters 512–514 have been received before initiating low power operation. Once all the bus grants have been received, low power controller 520 de-asserts clock enable signals provided to bus masters 530 and 540, and may assert a low power state indicator POWER_MODE to portions of system 500. Accordingly, the low power controller 520 is able to disable bus masters 530 and 540 only when all of the bus accesses associated with the bus masters 530 and 540 and the multiplexed system buses 551–553 have been processed, allowing system 500 to remain in a recoverable state for a initiating a low power mode of operation. Alternate embodiments of the present invention may disable clocking to bus masters 530 and 540 as individual bus grants from arbiters 512–514 are received, after determining that bus master 530 or 540 has completed all outstanding transfers.

Figure 10A:
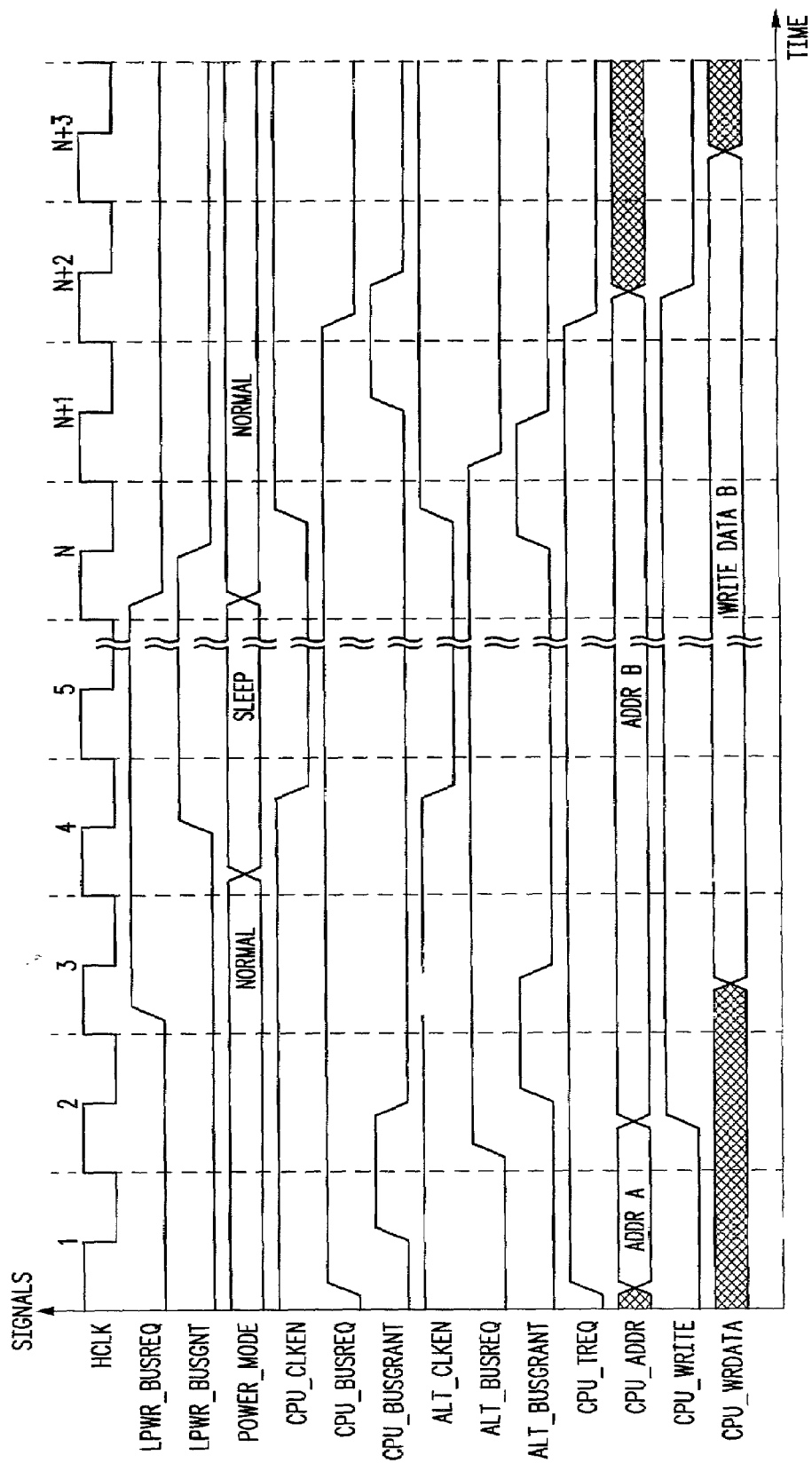
FIG. 10 is a timing diagram illustrating signals in a system, according to a specific embodiment of the present invention.
Figure 10B:
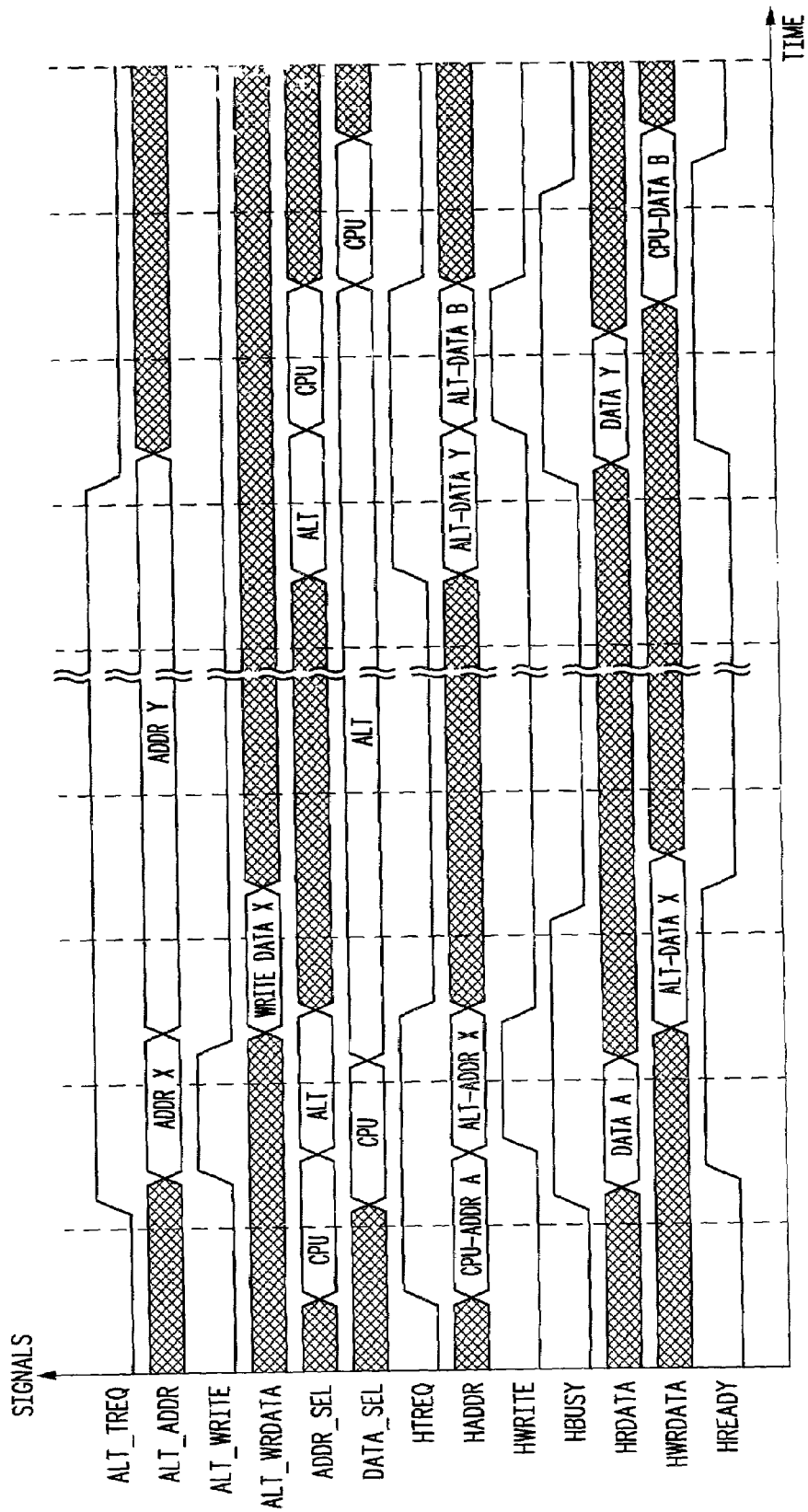

Referring now to FIG. 10, a timing diagram illustrating specific operation of one embodiment of the present invention is shown. In the illustrated embodiment, two bus masters, a CPU and a secondary, alternate bus master (ALT), are present in a system, such as low power device 100 (FIG. 1). The CPU asserts a bus request (CPU_BUSREQ) when it desires to obtain ownership of a bus, such as system bus 179 (FIG. 1). A bus arbiter, such as bus arbiter 110 (FIG. 1), asserts a bus grant signal (CPU_BUSGRANT) to grant ownership of the bus to the CPU. The ALT bus master asserts a bus request (ALT_BUSREQ) when it desires to obtain ownership of the bus. The bus arbiter asserts a bus grant signal (ALT_BUSGRANT) to grant ownership of the bus to ALT bus master. The CPU will perform a read access to address location ADDR A, followed by a write access to address location ADDR B. ALT will perform a write access to address location ADDR X, followed by a read access to address location ADDR Y.

The bus arbiter determines the relative order of the CPU and ALT accesses to the shared system bus by means of a bus arbitration priority mechanism. Multiple priority schemes are available and are well known in the art, such as first-come first-serve, round-robin, and fixed priority. The current invention does not rely on a particular scheme for priority ordering between the CPU and ALT bus masters, thus for this example a simple fixed scheme is illustrated in which ALT has a higher priority than CPU.

According to one embodiment of the present invention, an additional request input, LPWR_BUSREQ, is provided to the bus arbiter by a low power mode controller (LPMC), such as low power control module 150 (FIG. 1). The bus arbiter provides an additional output bus grant signal, LPWR_BUSGNT, to the low power mode controller. The low power mode controller provides a set of output signals, POWER_MODE, to indicate a current operating mode of the system. Clock enable signals are illustrated, which control clock generation to CPU and ALT masters. Low power operation is supported by negating a CPU clock enable signal, CPU_CLKEN, to the CPU, and an alternate clock enable signal, ALT_CLKEN, to ALT master. Negation of these signals causes clock generation for these units to be suspended, thus reducing power consumption. In the illustrated example, low power mode of operation will be initiated between the accesses performed by the CPU and ALT masters.

In clock cycle 1, the system is operating in a normal mode of operation as indicated by power mode signals POWER_MODE indicating a normal mode. Beginning in clock cycle 1, CPU asserts CPU_BUSREQ, indicating it desired ownership of the system bus, asserts a CPU_TREQ signal to indicate it is starting a transfer, and drives the CPU address line, CPU_ADDR, with ADDR A, corresponding to the desired access location. A CPU_WRITE signal is negated, indicating the access is a read. Since the ALT master is not requesting bus ownership in cycle 1, the bus arbiter grants bus ownership to CPU and asserts CPU_BUSGNT in cycle 1. The bus arbiter selects CPU_ADDR and CPU_WRITE to be driven onto system bus signals HADDR and HWRITE respectively by means of control signal ADDR_SEL. A system bus transfer request, HTREQ, is asserted, indicating a transfer is being requested on the system bus. Since no other access is outstanding, the transfer begins, and the address phase of the transfer completes at the end of cycle 1. The data phase of the transfer to location ADDR A begins in cycle 2, and an HBUSY signal is asserted to indicate the system data buses are busy. In the example shown, separate read and write data buses are illustrated, although in alternate embodiments, a single bidirectional data bus may be used.

A system read data bus HRDATA is driven by the system, or device, corresponding to address location ADDR A in cycle 2, with the data corresponding to ADDR A. The bus arbiter has driven the DATA_SEL signal to indicate the data phase belongs to the CPU. Data from HRDATA is provided to the CPU by way of a CPU_RDATA signal A responding device causes the assertion of system bus ready signal HREADY to indicate the requested data has been provided. At the end of cycle 2, the data phase of the access to location ADDR A has completed, and CPU has latched the read data internally. During cycle 2, CPU continues to assert CPU_BUSREQ, and CPU has requested a subsequent access to location ADDR B, has driven ADDR B onto the CPU_ADDR signals, and has asserted CPU_WRITE to indicate the requested access is a write cycle. Also during cycle 2, ALT master has asserted ALT_BUSREQ to indicate that it desires ownership of the system bus, and has asserted ALT_TREQ and driven ALT_ADDR with the value ADDR X, indicating it is requesting an access to be performed to location ADDR X. An ALT_WRITE signal is also asserted, indicating that the requested access is a write. The bus arbiter receives CPU_BUSREQ and ALT_BUSREQ, and determines that ALT master is to be granted ownership of the system bus. The bus arbiter negates CPU_BUSGNT, asserts ALT_BUSGNT, and changes ADDR_SEL signal to select the ALT_ADDR and ALT_WRITE signals to be driven onto system bus signals HADDR and HWRITE respectively, thus giving bus ownership to ALT master for the address phase that starts in cycle 2, and withholds address bus ownership from the CPU. The HTREQ signal remains asserted in cycle 2, indicating another system bus transfer is being requested. The bus master drives DATA_SEL signal to select the CPU for the current data phase, since this data phase is associated with the previous address phase, during which the CPU was granted bus ownership.

During cycle 3, the data phase corresponding to location ADDR X occurs, and ALT master drives ALT_WRDATA with DATA X. The bus arbiter drives the DATA_SEL signal to select ALT_WRDATA to be coupled to system write data bus HWRDATA, thus providing DATA X to the accessed device for writing. HBUSY remains asserted during cycle 3, indicating system data buses are busy. An accessed device corresponding to address location ADDR X causes assertion of system bus ready signal HREADY to indicate the write data is being accepted. At the end of cycle 3, the data phase of the access to location ADDR X completes. During cycle 3, CPU continues to drive CPU_BUSREQ, CPU_TREQ, and ADDR B on CPU_ADDR to indicate a cycle is still being requested, as well as system bus ownership. ALT master also continues to drive ALT_BUSREQ, ALT_TREQ, and drives ADDR Y on ALT_ADDR bus to indicate a cycle is still being requested, as well as system bus ownership. The ALT_WRITE signal is negated, indicating ALT master access to ADDR Y is a read cycle. In cycle 3, the low power controller asserts LPWR_BUSREQ to Bus Arbiter, in preparation for entering a low power mode. In accordance with one embodiment of the present invention, this request is assigned the highest priority of all potential requests. Assertion of LPWR_BUSREQ causes the arbiter to negate bus grant to all other requestors, thus in cycle 3, CPU_BUSGNT and ALT_BUSGNT are negated, indicating neither the CPU or ALT master is granted bus ownership. Since no address phase is initiated in cycle 3 due to the removal of bus ownership from requesting bus masters, system bus transfer request signal HTREQ is negated in cycle 3. The system address bus, HADDR, is not considered valid since no transfer is being requested, although the bus arbiter may select either ALT_ADDR or CPU_ADDR to be driven by default. Since the system data buses are busy in cycle 3 with the data phase of the access to location ADDR X, HBUSY remains asserted.

In cycle 4, HBUSY negates, indicating that the system data buses are now idle. At this point, the bus arbiter asserts LPWR_GNT signal to the low power controller, indicating that system bus activity has reached a quiescent state, and thus it is now safe to enter a low power mode of operation. The clock enable signals, CPU_CLKEN and ALT_CLKEN, are subsequently negated in cycle 4 to cause further clocking of CPU and ALT master to be suspended, and thereby causing system power consumption to be minimized. In cycle 5, the low power controller changes the POWER_MODE signals to indicate a low power SLEEP state has been entered. The low power SLEEP state remains in effect while Low Power Mode controller continues to assert LPWR_BUSREQ, and CPU_CLKEN and ALT_CLKEN remain negated to minimize system power consumption.

Once system events dictate a return to normal operating mode, the low power controller will negate LPWR_BUSREQ to the bus arbiter. In FIG. 10, this occurs during clock cycle N. When LPWR_BUSREQ is negated, the bus arbiter negates LPWR_BUSGNT, and arbitration between CPU and ALT master is resumed. Based on arbitration priorities, the bus arbiter grants system bus ownership to ALT master in cycle N, and drives ADDR_SEL correspondingly, thus system bus HADDR is driven with ADDR Y, and HWRITE is negated. HTREQ is asserted in cycle N, indicating a new system bus transfer is being requested. During cycle N and N+1, CPU continues to drive CPU_BUSREQ, CPU_TREQ, and ADDR B on CPU_ADDR to indicate a cycle is still being requested as well as system bus ownership. In cycle N+1, ALT master negates ALT_BUSREQ and ALT_TREQ, indicating ownership of the system bus is no longer desired, and no transfer is being requested. The bus arbiter negates ALT_BUSGNT and asserts CPU_BUSGNT to hand system bus ownership to CPU. The bus arbiter drives ADDR_SEL signal to couple CPU_ADDR and CPU_WRITE signals to HADDR and HWRITE respectively. HADDR is driven with the value ADDR B, and HWRITE is asserted, indicating the requested access by the CPU is a write cycle.

During cycle N+1, HBUSY is asserted to indicate that the system data buses are busy with a data phase. During cycle N+1, read data is returned by the device corresponding to address location ADDR Y by way of system read data bus HRDATA, and causes assertion of system bus ready signal HREADY to indicate the read data is being provided, and the bus arbiter drives DATA_SEL to indicate that this data phase is for ALT master. ALT master latches returning read DATA Y in cycle N+1, and at the end of cycle N+1, the data phase of the access to location ADDR Y completes.

During Cycle N+2, the bus arbiter drives DATA_SEL to cause write data provided on CPU_WRDATA signals to be coupled to system bus write data signals HWRDATA. HBUSY remains asserted during cycle N+2 to indicate the system data buses are busy. The accessed device corresponding to ADDR B causes assertion of system bus ready signal HREADY to indicate the write data is being accepted. At the end of cycle N+2, the data phase of the access to location ADDR B completes. CPU negates CPU_TREQ and CPU_BUSREQ to indicate that no further transfer is being requested, and system bus ownership is no longer desired. During cycle N+3, HBUSY is negated, indicating system data buses are idle.

Other examples of bus arbitration operation and system bus handoff are well known in the art, and the example given is not meant to limit the scope of the current invention to the exact sequence or protocols shown. By acting as an alternate bus master with regard to bus arbitration, the low power controller can ensure that a transition into low power modes is effected at an appropriate boundary, and that outstanding system bus accesses have terminated prior to enabling low power modes and performing clock gating of the CPU and alternate master logic.

The example of low power arbitration operation shown in FIG. 10 may be extended to a system in which multiple system buses are present, such as system 500 (FIG. 9). In such an environment, the low power controller, such as low power controller 520 (FIG. 5), will request ownership of all system buses. As current bus activity completes, the low power controller will be eventually granted ownership of all system buses. This process may occur one-by-one, or may occur simultaneously, or in any combination. Once ownership of all system buses is complete, the low power controller may then force the system into a low power mode. Alternatively, the low power controller may place blocks, units, or elements associated with a given system bus in a low power mode as soon as ownership of that particular bus has been granted to the low power controller. If a particular block or unit is associated with multiple system buses, low power mode entry for that block will be delayed until it can be determined that the block is either idle, or has reached a bus cycle boundary, such that no outstanding bus access exists for that block or unit.

Figure 11B:
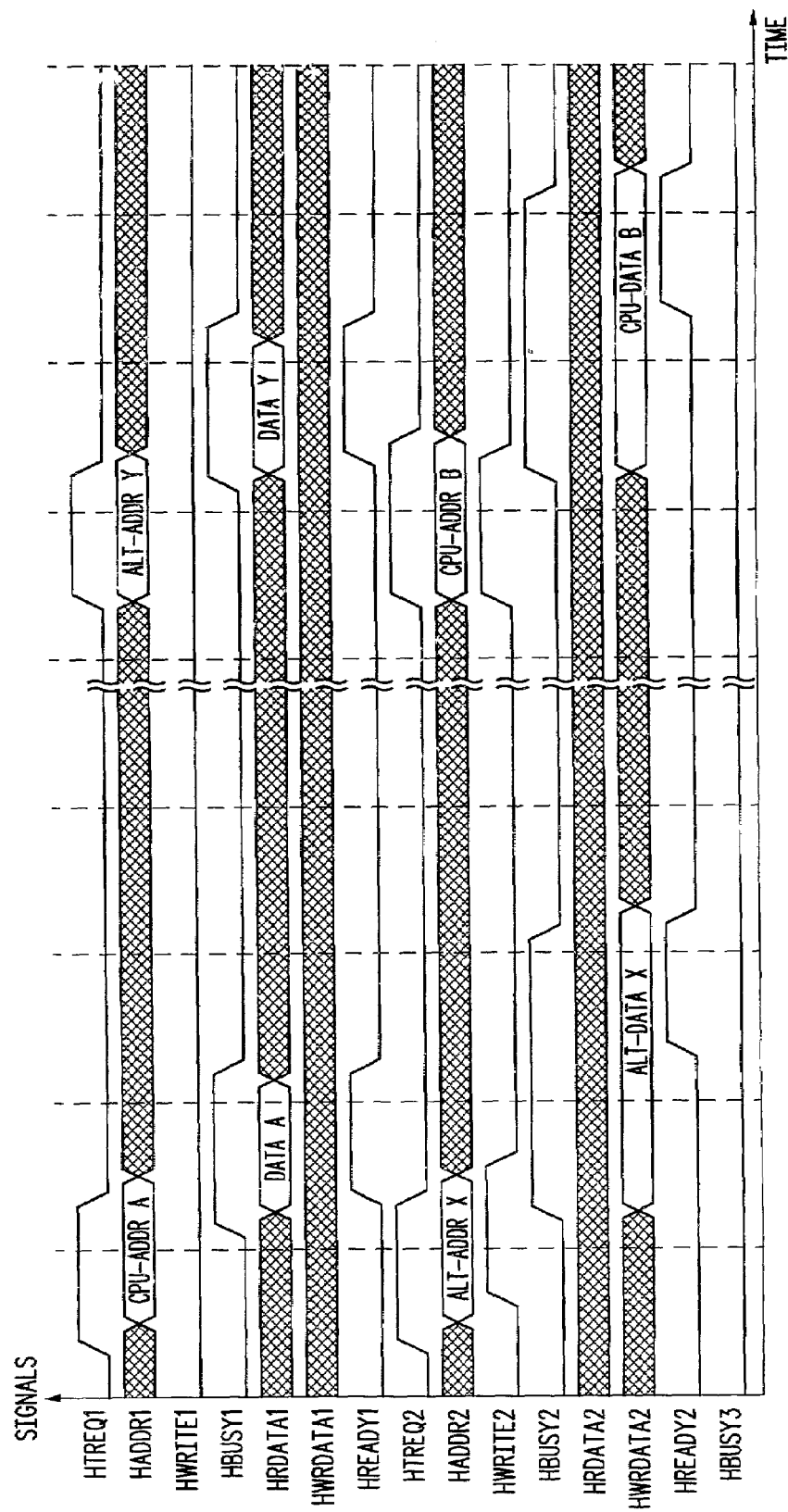
FIG. 11 is another timing diagram illustrating signals in a system, according to a specific embodiment of the present invention.

Referring now to FIG. 11, a timing diagram illustrating signal timing associated with another embodiment of the present invention is shown. In the illustrated embodiment, three system buses are present, and are interconnected to two bus masters, the CPU and ALT master. For the purposes of this example, CPU will perform a read access to address location ADDR A, followed by a write access to address location ADDR B. ALT will perform a write access to address location ADDR X, followed by a read access to address location ADDR Y. Bus arbiters associated with each system bus determine the relative order of the CPU and ALT accesses to the respective system bus by means of a bus arbitration priority mechanism Multiple priority schemes are available and are well known in the art such as first-come first-serve, round-robin, and fixed priority. The current invention does not rely on a particular scheme for priority ordering between CPU and ALT master, thus for this example a simple fixed scheme is illustrated in which ALT has a higher priority than CPU. Alternate embodiments may incorporate different priority schemes, and may incorporate differing schemes for each particular system bus.

In the illustrated example, CPU and ALT master are interconnected to system buses 1, 2, and 3 by means of a fully interconnected crossbar switch, such as crossbar switch 510 (FIG. 9). At each system bus output of the switch, control logic receives CPU signals CPU_TREQ and CPU_ADDR, as well as ALT master signals ALT_TREQ and ALT_ADDR. In one embodiment of the present invention, each system bus corresponds to a particular portion of the system address space. By decoding a portion of CPU_ADDR and ALT_ADDR, each individual system bus connection determines whether the currently requested access by CPU or ALT master is targeted to that particular system bus. This decoding arrangement provides for "implicit" bus requests by CPU and ALT master, since each transfer request targets one of the multiple system bus connection, based on the particular access address. By decoding a portion of the access address from each bus master, a determination that a request for a particular system bus is being made is easily accomplished. When both bus masters present an access request which corresponds to the same system bus port in the same cycle, arbitration between the requests is performed by each system bus arbiter. Alternate embodiments of the present invention may provide explicit bus requests from each bus master to each of the multiple system bus arbiters.

According to one embodiment of the present invention, an additional explicit request input, LPWR_BUSREQ, is provided to each of the multiple system bus arbiters by a low power mode controller. Each Bus Arbiter provides an additional bus grant output signal to the low power mode controller. In the illustrated example, three signals are provided; LPWR_BUSGNT 1, LPWR_BUSGNT 2, and LPWR_BUSGNT 3 corresponding to system buses 1, 2, and 3 respectively. The low power mode controller provides a set of output signals POWER_MODE to indicate a current operating mode of the system. Clock enable signals are illustrated, which control clock generation to the two bus masters, CPU and ALT master. Low power operation is supported by negating clock enable signals, CPU_CLKEN to the CPU, and ALT_CLKEN to ALT master. Negation of these signals causes clock generation for these units to be suspended, thus reducing power consumption. In the illustrated example, a low power mode of operation will be initiated between the accesses performed by CPU and ALT master.

In clock cycle 1, the system is operating in a normal mode of operation as indicated by power mode signals POWER_MODE signaling a normal mode of operation. Beginning in clock cycle 1, CPU asserts CPU_TREQ to indicate it is requesting a transfer, and drives CPU_ADDR with ADDR A, corresponding to the desired access location. CPU_WRITE is negated, indicating the access is a read. In this example, ADDR A corresponds to a location associated with system bus 1. Also in cycle 1, ALT master asserts ALT_TREQ to indicate it is requesting a transfer, and drives ALT_ADDR with ADDR X, corresponding to the desired access location. ALT_WRITE is asserted, indicating the access is a write. In this example, ADDR X corresponds to a location associated with system bus 2. Since ALT master is not requesting a bus transfer to system bus 1 in cycle 1, system bus arbiter 1 grants bus ownership to CPU and selects CPU_ADDR and CPU_WRITE to be driven onto system bus 1 signals HADDR1 and HWRITE1. System bus 1 transfer request HTREQ1 is asserted, indicating a transfer is being requested on system bus 1. Since no other access is outstanding, the transfer begins, and the address phase of the transfer completes at the end of cycle 1. Also in cycle 1, system bus arbiter 2 grants bus ownership to ALT master and selects ALT_ADDR and ALT_WRITE to be driven onto system bus 2 signals HADDR2 and HWRITE2. System bus 2 transfer request HTREQ2 is asserted, indicating a transfer is being requested on system bus 2. Since no other access is outstanding, the transfer begins, and the address phase of the transfer completes at the end of cycle 1. Note that since the accesses requested by CPU and ALT master were to addresses that correspond to different system buses, these accesses are performed concurrently.

The data phase of the transfer to location ADDR A on system bus 1 begins in cycle 2, and HBUSY1 is asserted to indicate the system data buses 1 are busy. The data phase of the transfer to location ADDR X on system bus 2 begins in cycle 2, and HBUSY2 is asserted to indicate the system data buses 2 are busy. In the example shown, separate read and write data buses are illustrated, although in alternate embodiments, a single bidirectional data bus may be used. System read data bus 1 HRDATA1 is driven by the device corresponding to address location ADDR A in cycle 2, with the data corresponding to ADDR A. Data from HRDATA1 is provided to the CPU by way of CPU_RDATA. The responding device causes the assertion of system bus 1 ready signal HREADY1 to indicate the requested data has been provided, and CPU_READY is subsequently asserted.

At the end of cycle 2, the data phase of the access to location ADDR A has completed, and CPU has latched the read data internally. During cycle 2, system write data bus 2 HWRDATA2 is driven with the write data from ALT master's ALT_WRDATA bus corresponding to address location ADDR X. For this transfer, the responding device is busy and cannot complete the write transfer in cycle 2, thus the responding device causes the negation of system bus 2 ready signal HREADY2 to indicate the write data has not been accepted. At the end of cycle 2, the data phase of the access to location ADDR X will be extended since it has not completed. ALT_READY is negated to signal ALT master that the data phase must be extended. During cycle 2, CPU continues to assert CPU_TREQ to request a subsequent access to location ADDR B, drives ADDR B onto the CPU_ADDR signals, and has asserted CPU_WRITE to indicate the requested access is a write cycle. Also during cycle 2, ALT master has asserted ALT_TREQ and driven ALT_ADDR with the value ADDR Y, indicating it is requesting another access to be performed to location ADDR Y. ALT_WRITE is negated, indicating that the requested access is a read.

During cycles 1 and 2, system bus 3 remains idle since no access has been requested to a location which corresponds to it., as indicated by HBUSY3 negated. It should be noted that not all system bus 3 signals are shown, since in this example, no access is requested to it. In cycle 2, the low power controller desires to place the system in a low power mode, and asserts LPWR_BUSREQ to system bus arbiters 1, 2, and 3. System Bus Arbiter 3 receives LPWR_BUSREQ and asserts LPWR_BUSGNT3 in cycle 2 since system bus 3 is currently idle. Since a low power bus request is pending, system buses' 1 and 2 transfer request signals HTREQ1 and HTREQ2 are negated in cycle 2 by the respective system bus controllers to prevent new transfers from being initiated.

In cycle 3, system bus 1 signal HBUSY1 is negated, indicating system bus 1 is now idle, and system bus 1's bus arbiter asserts LPWR_BUSGNT1 to the low power controller, since a bus cycle boundary has been reached. Also in cycle 3, system bus 2's HREADY2 signal is asserted by the device corresponding to location ADDR X, indicating that the write cycle initiated in cycle 1 is now completing. In cycle 4, system bus 2 becomes idle and the HBUSY2 signal is negated. Since no bus transaction is in progress, system bus 2's bus arbiter asserts LPWR_BUSGNT2 to the low power controller. At this point, the low power controller has obtained bus ownership for all system buses, indicating that system bus activity has reached a quiescent state, and thus it is now safe to enter a low power mode of operation. Clock enable signals, CPU_CLKEN and ALT_CLKEN, are subsequently negated in cycle 4 to cause further clocking of CPU and ALT master to be suspended, thereby causing system power consumption to be minimized. In cycle 5, the low power controller changes the POWER_MODE signals to indicate a low power SLEEP state has been entered. The low power SLEEP state remains in effect while the low power mode controller continues to assert LPWR_BUSREQ, and CPU_CLKEN and ALT_CLKEN remain negated to minimize system power consumption.

Once system events dictate a return to normal operating mode, the low power controller will negate LPWR_BUSREQ to all system bus arbiters. In FIG. 11, this occurs during clock cycle N. When LPWR_BUSREQ is negated, system bus arbiters 1, 2, and 3 negate LPWR_BUSGNT1, LPWR_BUSGNT2, and LPWR_BUSGNT3 respectively, and arbitration between CPU and ALT master is resumed. Both CPU and ALT master have pending access requests (CPU_TREQ and ALT_TREQ are both asserted). CPU is requesting a write to location ADDR B that corresponds to system bus 2, and ALT master is requesting a read access to ADDR Y that corresponds to system bus 1. Since no conflict exists for access to system buses 1 and 2, both accesses are initiated in cycle N. The remainder of the transfers are shown in cycles N+1 through N+3, and follow the previously described protocols.

Other examples of bus arbitration operation and system bus handoff are well known in the art, and the example given is not meant to limit the scope of the current invention to the exact sequence or protocols shown. By acting as an alternate bus master with regard to bus arbitration, the low power controller can ensure that a transition into low power modes is effected at an appropriate boundary, and that outstanding system bus accesses on multiple system buses have terminated prior to enabling low power modes and performing clock gating of CPU and alternate master logic. Although clock gating in FIG. 11 was shown occurring after all system buses were idle, alternate embodiments may place a subset of system elements in a clock-gated or other low power state as each system bus reaches a quiescent state.

The systems described herein may be part of an information handling system. The term "information handling system" refers to any system that is capable of processing information or transferring information from one source to another. An information handling system may be a single device, such as a computer, a hand held computing device, such as a personal digital assistant (PDA), a cable set-top box, an Internet capable device, such as a cellular phone, and the like. Alternatively, an information handling system may refer to a collection of such devices. It should be appreciated that the system described herein has the advantage of identifying a recoverable state to initiate a low power mode of operation in a low power device.

In the preceding detailed description of the embodiments, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
   determining to enter a low power made;
   providing a bus request to an arbiter in response to the determination to enter the low power mode;
   disabling a first clock provided to at least a portion of a first bus master associated with the arbiter in response to the bus request;
   receiving a bus grant signal associated with the bus request;
   reducing power to a first portion of a system, in addition to the first bus master, in response to receiving the bus grant signal;
   wherein the arbiter prioritizes requests from different requestors;
   wherein the reguestors include the first bus master; and
   wherein the bus request is assigned a fixed priority.

2. The method as in claim 1, wherein disabling the first clock is performed in response to receiving the bus grant signal.

3. The method as in claim 1, further including reducing power to only one of the first portion of the system and a second portion of the system.

4. The method as in claim 1, further including receiving an indicator to return to a nominal power mode.

5. The method as in claim 4, further including enabling the first clock in response to receiving the indicator to return to the nominal power mode.

6. The method as in claim 1, wherein determining to enter the low power mode is hardwired into the arbiter.

7. The method as in claim 1, wherein determining to enter the lower power mode is based on a register setting.

8. The method as in claim 1, wherein disabling the first clock of the first bus master is performed when the first bus master is in a recoverable state.

9. The method as in claim 8, wherein the recoverable state is identified at the completion of a current bus access cycle associated with the first bus master.

10. The method as in claim 1, wherein the bus request is assigned a higher priority than a subset of requests from the first bus master.

11. A system comprising:
    a register to indicate a power mode; and
    an arbiter coupled to the register to:
       monitor the power mode and to prevent processing bus requests associated with at least one of a first bus master and a second bus master when a lower power mode is indicated, wherein the lower power mode is different than a nominal power mode;
       process a low power bus request when the lower power mode is indicated and to prevent processing a least one of said bus requests after a low power bus request is generated; and
       wherein said arbiter prioritizes bus requests from the first bus master and the second bus master and further wherein the low power bus request is given a higher priority than at least a subset of said bus requests.

12. The system as in claim 11, wherein the low power request is assigned a fixed priority.

13. The system as in claim 11, wherein said arbiter disables clock signals provided to at least a portion of the at least one of the first bus master and the second bus master.

14. The system as in claim 13, wherein said arbiter is further used to identify a current bus access state associated with the at least one of the first bus master and the second bus master and wherein said arbiter disables said clock signals only when the at least one of the first bus master and the second bus master is in a recoverable state.

15. The system as in claim 14, wherein the recoverable state includes a state in which a bus access associated with the at least one of the first bus master and the second bus master has completed.

* * * * *